(12) United States Patent
Brandenburger et al.

(10) Patent No.: US 9,624,342 B2
(45) Date of Patent: Apr. 18, 2017

(54) PROCESS FOR MANUFACTURING MEDIUM AND HIGH MOLECULAR WEIGHT POLYESTERS

(75) Inventors: Larry B. Brandenburger, Circle Pines, MN (US); Thomas J. Melnyk, Greenfield, MN (US)

(73) Assignee: Valspar Sourcing, Inc., Minneapolis, MN (US)

( * ) Notice: Subject to any disclaimer, the term of this patent is extended or adjusted under 35 U.S.C. 154(b) by 1022 days.

(21) Appl. No.: 12/027,233

(22) Filed: Feb. 6, 2008

(65) Prior Publication Data

US 2009/0198005 A1     Aug. 6, 2009

(51) Int. Cl.
*C08G 63/81*     (2006.01)

(52) U.S. Cl.
CPC ................................. *C08G 63/81* (2013.01)

(58) Field of Classification Search
CPC ....................................................... C08G 63/81
USPC ......................................... 523/400; 524/601
See application file for complete search history.

(56) References Cited

U.S. PATENT DOCUMENTS

| | | |
|---|---|---|
| 2,983,695 A | 5/1961 | Wetroff et al. |
| 3,056,818 A | 10/1962 | Werber |
| 3,061,573 A | 10/1962 | Horsten |
| 3,326,965 A | 5/1967 | Schultheis et al. |
| 3,401,140 A | 9/1968 | Blades et al. |
| 3,427,287 A | 2/1969 | Pengilly |
| 3,553,284 A | 1/1971 | Riemhofer et al. |
| 3,819,585 A | 6/1974 | Funk et al. |
| 4,071,578 A | 1/1978 | Lasher |
| 4,100,142 A | 7/1978 | Schaefer et al. |
| 4,200,560 A | 4/1980 | Kubo et al. |
| 4,356,299 A | 10/1982 | Cholod et al. |
| 4,393,121 A | 7/1983 | Tobias et al. |
| 4,554,343 A | 11/1985 | Jackson, Jr. et al. |
| 4,590,259 A | 5/1986 | Kosky et al. |
| 4,680,376 A | 7/1987 | Heinze et al. |
| 4,758,650 A | 7/1988 | Schulz Van Endert |

(Continued)

FOREIGN PATENT DOCUMENTS

| | | |
|---|---|---|
| GB | 969896 | 9/1964 |
| GB | 1013034 | 12/1965 |

(Continued)

OTHER PUBLICATIONS

Lyondell Chemical Co., Application Data Sheets for MPDiol® Glycol entitled "The Use of MPDiol Glycol in the Manufacture of Polymers in the European Union", 6 pages (2006).

(Continued)

*Primary Examiner* — Michael Pepitone

(57) ABSTRACT

Medium and high molecular weight polyester polymers are prepared in syrup form from an ester oligomer. The oligomer is converted to the polymer by polycondensation at elevated pressure and elevated temperature in a nonreactive carrier capable of forming an azeotrope with water. The ester oligomerization or polycondensation reactions desirably are monitored using a non-viscometric technique. The process has a rapid cycle time. The syrup contains the polymer and nonreactive carrier, and may more conveniently be used to make initially non-solid products such as polyester coatings than is the case when employing pelletized solid polyester resins.

18 Claims, 3 Drawing Sheets

(56) References Cited

U.S. PATENT DOCUMENTS

| | | | |
|---|---|---|---|
| 5,250,659 | A | 10/1993 | Bradford et al. |
| 5,296,586 | A | 3/1994 | Burch et al. |
| 5,334,652 | A * | 8/1994 | Wellman et al. ............ 524/601 |
| 5,401,796 | A | 3/1995 | Kashima et al. |
| 5,484,882 | A | 1/1996 | Takada et al. |
| 5,578,827 | A | 11/1996 | Wolf et al. |
| 5,677,415 | A | 10/1997 | Bhatia |
| 5,786,443 | A | 7/1998 | Lowe |
| 5,811,496 | A * | 9/1998 | Iwasyk et al. ............... 525/444 |
| 5,817,722 | A | 10/1998 | Yezrielev et al. |
| 5,854,340 | A | 12/1998 | Donate et al. |
| 5,856,423 | A | 1/1999 | Bhatia |
| 5,976,706 | A | 11/1999 | Yezrielev et al. |
| 5,981,690 | A | 11/1999 | Lustig et al. |
| 6,043,335 | A | 3/2000 | Banach et al. |
| 6,090,882 | A | 7/2000 | Trumbo et al. |
| 6,281,325 | B1 | 8/2001 | Kurian et al. |
| 6,887,953 | B2 | 5/2005 | Eng |
| 6,906,164 | B2 | 6/2005 | DeBruin |
| 2004/0072983 | A1 | 4/2004 | Eng |
| 2005/0227100 | A1 | 10/2005 | Brandenburger et al. |
| 2006/0093768 | A1 * | 5/2006 | Parekh et al. ............... 428/35.8 |

FOREIGN PATENT DOCUMENTS

| | | |
|---|---|---|
| JP | 64-038431 | 2/1989 |
| JP | 02-235921 | 9/1990 |

OTHER PUBLICATIONS

Degussa product information sheets for *Dynapol® Polyester Resins* and *Vesticoat® UB Blocked Polyester-Polyurethane Systems*, 6 pages downloaded from internet website (www.coatings-colorants.com) on Jun. 12, 2007.

Degussa product information sheets for dynacoll, *Dynapol®s Product Range Copolyesters, Raw materials for industrial adhesive*, 8 pages downloaded from internet website (www.coatings-colorants.com) on Jun. 12, 2007.

Wicks, Zeno W. et al., Chapter X entitled "*Alkyd Resins*", from Organic Coatings: Science and Technology, vol. 1: Film Founation, Components, and Appearance, pp. 144-161 (1992).

Takahashi, H. et al., "Convenient Synthesis of Poly(butylene succinate) Catalyzed by Distannoxane", Chemistry Letters 2000, pp. 684-685.

Ishii M. et al., "Covenient Synthesis of Aliphatic Polyesters by Distannoxane-Catalyzed Polycondensation", Biomacromolecules, 2001, vol. 2, No. 4, pp. 1267-1270.

Heikka RA et al.: "Determination of acid value, hydroxyl value and water content in reactions between dicarboxylic acids and diols using near-infrared spectroscopy and non-linear partial least squares regression", Analytica Chimica Acta, (1997), pp. 287-294, vol. 349, Elsevier Science B.V.

Workman, Jerome Jr., "An Introduction to near Infrared Spectroscopy", http://webcache.googleusercontent.com/search?hl=hu&safe=active&q=cache:0186LxiUEfwJ:http://www.spectroscopynow.com/coi/cda/detail.cda?id=1881&type=EducationFeature&chld=2&page=1+hydroxyl+determination+by+NIR&ct=clnk, (Dec. 9, 2005).

Supplemental Search Report issued on Jul. 21, 2014 by the European Patent Office for related application No. EP 09708559.1. (6 pages).

* cited by examiner

PROCESS FOR MANUFACTURING MEDIUM AND HIGH MOLECULAR WEIGHT POLYESTERS

FIELD

This invention relates to polyester manufacturing.

BACKGROUND

Linear polyesters typically are prepared from oligomers made by reacting together one or more dicarboxylic acids and one or more diols via direct esterification, by reacting together one or more dimethyl esters and one or more diols via transesterification, or by carrying out both direct esterification and transesterification in a single reaction mixture. Water evolves from the reaction mixture in the case of direct esterification, and methanol evolves from the reaction mixture in the case of transesterification. The resulting oligomers may be converted to higher molecular weight polyester polymers via polycondensation. Branched polyesters may be made by introducing tri- or higher-functional reactants in place of some of the dicarboxylic acids, diols or dimethyl esters.

Low molecular weight polyesters normally are prepared in a single stage reaction that accomplishes both direct esterification and polycondensation. The reaction typically is carried out at atmospheric pressure and at temperatures near the normal boiling point for the diol (e.g., at temperatures of about 170-210° C. for reactions using ethylene glycol). A large diol excess normally is employed. A small quantity (e.g., about 3%) of xylenes may be added near the end of the reaction to assist in distilling water from the reaction mixture. The end product is a low molecular weight polyester which after cooling to room temperature may be a liquid or in some cases an amorphous solid.

Medium and high molecular weight polyesters typically are made via a two stage process. The first stage typically is a direct esterification or transesterification reaction to form a liquid low molecular weight oligomer and the second stage typically is a polycondensation reaction to convert the oligomer to a polymer with a targeted molecular weight. Considerable time may be required to complete the two stages. The first stage esterification reaction may for example be carried out using conditions similar to the low molecular weight polyester direct esterification reaction conditions described above. The second stage polycondensation reaction typically is performed using melt or solid state polymerization, together with vacuum (e.g., about 0.1-1 mm pressure) and high temperature (e.g., temperatures above ambient temperature such as about 270-290° C. for polyesters derived from ethylene glycol). The vacuum and heat aid in removal of the excess diol. The reaction mixture typically has sufficiently high viscosity so that it would be unduly difficult to stir it during the polycondensation reaction. The end product is a medium or high molecular weight polyester which after cooling is a solid. The solid product typically is pelletized prior to shipment to an end user. The end user may in turn melt the pellets using an extruder or other suitable device and form the melt into a film or mold it into solid objects. For example, containers (e.g., bottles in the case of polyethylene terephthalate resins) represent a very high volume use for pelletized polyester resins.

SUMMARY OF THE INVENTION

We have found a process for preparing medium or high molecular weight polyester syrups, which process comprises:

a) providing or forming an ester oligomer;
b) converting the oligomer to a polyester polymer by stirring at elevated pressure and elevated temperature a solution of the oligomer in a nonreactive carrier capable of forming an azeotrope with water; and
c) removing water from the mixture via azeotropic reflux to provide a syrup comprising a medium or high molecular weight polyester polymer in the nonreactive carrier.

The invention provides in another aspect novel polyester syrups comprising a nonreactive carrier and a linear polyester polymer having a number average molecular weight (Mn) of 6,000 to 20,000 amu and a hydroxyl number of 5 to 20, the polymer having a backbone free of or substantially free of ethylene oxide or propylene oxide groups and the syrup being free of or substantially free of alcohols, glycols or esters that react with the polymer at polycondensation temperatures.

The invention provides in another aspect a packaged polyester product comprising a container suitable for interstate or export shipment within which is stored a polyester syrup comprising a solution of high molecular weight polyester polymer in a nonreactive carrier capable of forming an azeotrope with water, the solution being free of or substantially free of alcohols, glycols or esters that react with the polymer at polycondensation temperatures and containing at least about 5% or more of nonreactive carrier.

The invention provides in another aspect a packaged polyester product comprising a container suitable for interstate or export shipment within which is stored a polyester syrup consisting essentially of a solution of high molecular weight polyester polymer in a nonreactive carrier for the polymer capable of forming an azeotrope with water.

The disclosed process offers rapid reaction completion and may enable greater flexibility in the choice of reactants. The resulting liquid polyester product can more conveniently be used to manufacture polyester coatings and other liquid polyester products than is the case when using pelletized solid polyester starting materials.

BRIEF DESCRIPTION OF THE DRAWING

Like reference symbols in the various figures of the drawing indicate like elements. The elements in the drawing are not to scale.

DETAILED DESCRIPTION

Unless the context indicates otherwise the following terms shall have the following meaning and shall be applicable to the singular and plural:

The terms "a," "an," "the," "at least one," and "one or more" are used interchangeably. Thus, for example, a coating composition that contains "an" additive means that the coating composition may include "one or more" additives.

The term "azeotrope" means a mixture of two or more pure compounds which form a constant boiling point mixture.

The term "elevated temperature" means a temperature of at least 120° C.

The term "esterification" refers to direct esterification or transesterification.

When used with respect to a polymer, the term "low molecular weight" means a polymer whose Mn is less than 4,000 amu, "medium molecular weight" means a polymer whose Mn is 4,000 up to 7,000 amu and "high molecular weight" means a polymer whose Mn is greater than 7,000 amu.

The term "nonreactive carrier" means a solvent or other carrier which can dissolve, disperse or otherwise solubilize a medium or high molecular weight polyester to form the disclosed polyester syrup, which is not a reactant (e.g., not a glycol) from which the polyester is formed, and which will not react with the polyester (e.g., will not transesterify with the polyester) at polycondensation temperatures.

The term "non-viscometric technique" means a method for monitoring the progress of a polymer-forming reaction without requiring a viscosity measurement.

The term "polycondensation temperatures" means temperatures of at least 200° C.

The term "polyester" refers to linear and branched polyesters.

The term "polyester syrup" means a liquid which is readily pourable at room temperature and which contains a medium molecular weight or high molecular weight polyester polymer in a nonreactive carrier.

The terms "preferred" and "preferably" refer to embodiments of the invention that may afford certain benefits, under certain circumstances. However, other embodiments may also be preferred, under the same or other circumstances. Furthermore, the recitation of one or more preferred embodiments does not imply that other embodiments are not useful, and is not intended to exclude other embodiments from the scope of the invention.

When used with respect to a component which may be found in a mixture, the term "substantially free of" means containing less than about 5 wt. % of the component based on the mixture weight.

The recitation of a numerical range using endpoints includes all numbers subsumed within that range (e.g., 1 to 5 includes 1, 1.5, 2, 2.75, 3, 3.80, 4, 5, etc.).

Figure 1:
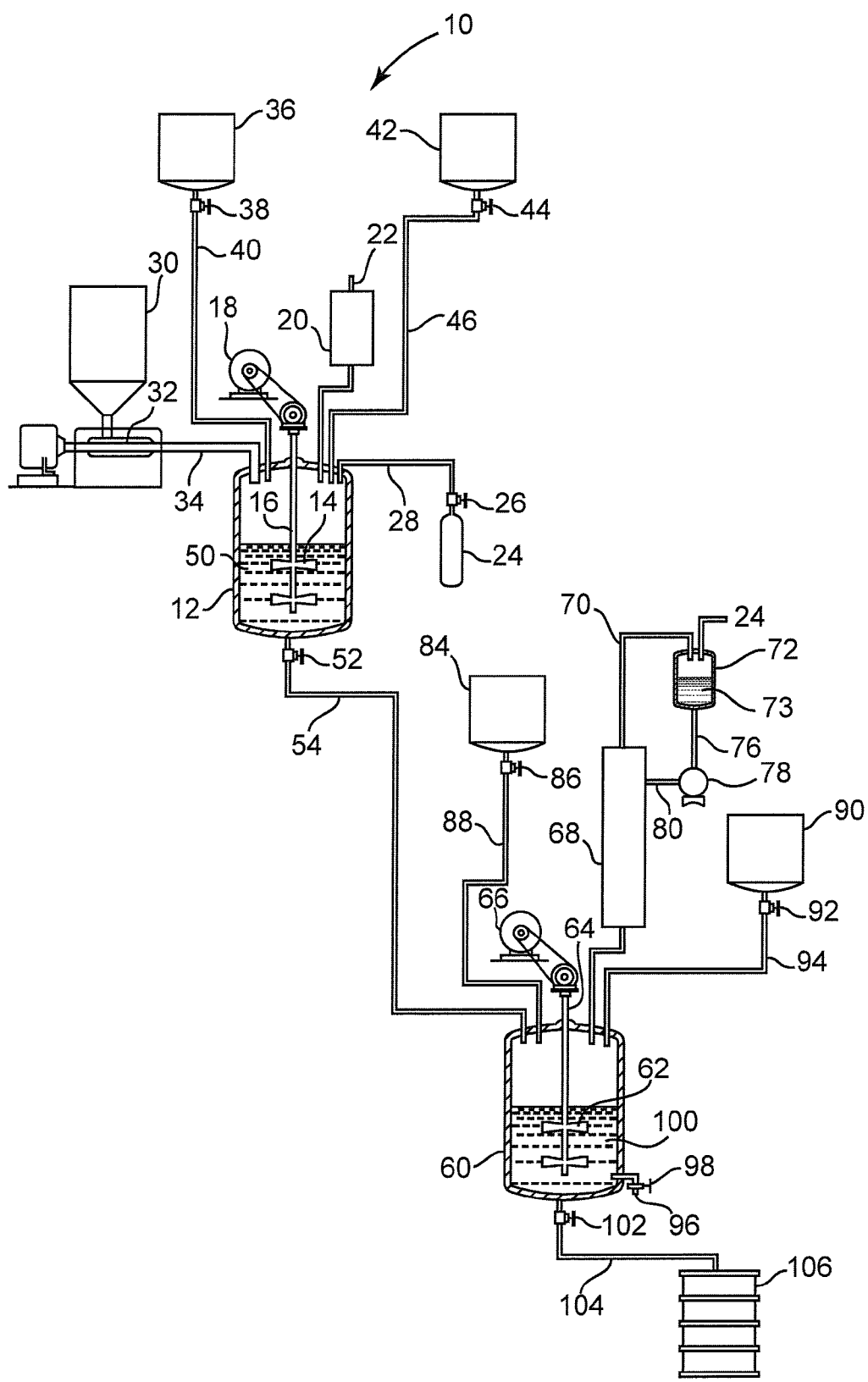
FIG. 1 is a schematic view of one embodiment of the disclosed process.

FIG. 1 shows an exemplary schematic view of one embodiment of the disclosed process in which a two-stage reaction is performed. Apparatus 10 includes an esterification reactor 12 for forming an ester oligomer by direct esterification or transesterification. Reactor 12 is equipped with an impeller 14 mounted on shaft 16 and driven by a motor 18. Fractional distillation column 20 enables removal of water through outlet 22. Inert gas supply 24 is regulated by valve 26 and fed to reactor 12 through conduit 28. A carboxylic acid reactant stored in vessel 30 (typically in solid form) may be melted using extruder 32 and fed to reactor 12 through conduit 34. Extruder 32 may be omitted for reactants (e.g., isophthalic or terephthalic acid) that may be degraded in an extruder and which may simply be added in solid form to reactor 12. Extruder 32 may also be omitted for reactants (e.g., phthalic anhydride) whose melting behavior is such that they may be melted in vessel 30 and fed directly to reactor 12 through conduit 34. A glycol reactant stored in vessel 36 (usually in liquid form) is regulated by valve 38 and fed to reactor 12 through conduit 40. A catalyst solution stored in vessel 42 is regulated by valve 44 and fed to reactor 12 through conduit 46. At the completion of the esterification reaction, an oligomer or low molecular weight polyester product 50 is removed from reactor 12 by opening valve 52 and fed through conduit 54 to polycondensation reactor 60.

Reactor 60 is a pressurizable vessel equipped with an impeller 62 mounted on shaft 64 and driven by motor 66. Reflux distillation column 68 removes reaction byproducts and evaporated nonreactive carrier from reactor 60 and passes them through conduit 70 to condenser 72. Condensed nonreactive carrier 73 is collected in the bottom of condenser 72 and reaction byproducts are removed via port 74. Drain conduit 76, pump 78 and return conduit 80 enable condensed nonreactive carrier 73 to be returned to column 68. Nonreactive carrier stored in vessel 84 is regulated by valve 86 and fed to reactor 60 through conduit 88. A catalyst solution stored in vessel 90 is regulated by valve 92 and fed to reactor 60 through conduit 94. The polycondensation reaction is performed under pressure and its progress may be monitored in a variety of ways, e.g., by withdrawing samples at sampling port 96 when valve 98 is opened. When the polycondensation reaction is judged to be complete, the polycondensation reaction product syrup 100 is removed from reactor 60 by opening valve 102 and feeding the reaction product 100 through conduit 104 to shipping drum 106.

The esterification and polycondensation reactions outlined in FIG. 1 may be referred to as first and second stages respectively involving oligomerization and polymer formation. It will be appreciated by persons having ordinary skill in the art that the dividing line between oligomerization and polymerization may be somewhat hard to draw, and that some polymer formation may take place in reactor 50 and some oligomerization may take place in reactor 60.

Figure 2:
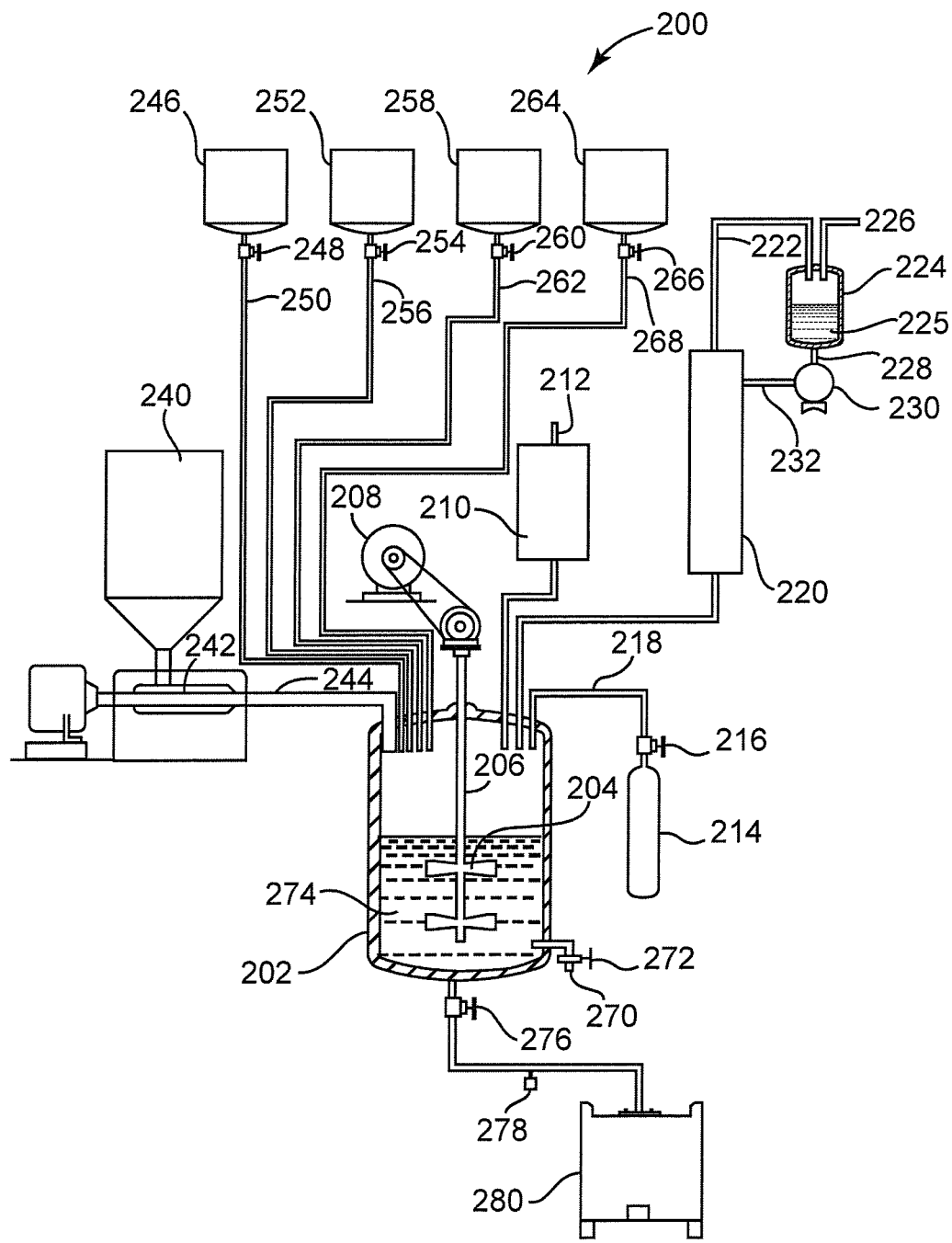
FIG. 2 is a schematic view of another embodiment of the disclosed process.

The reactions outlined in FIG. 1 may be performed in a single pressurizable reactor. FIG. 2 shows an exemplary schematic view of a single reactor embodiment of the disclosed process. Apparatus 200 includes a pressurizable reactor 202 equipped with an impeller 204 mounted on shaft 206 and driven by a motor 208. Fractional distillation column 210 enables removal of water through outlet 212. Inert gas supply 214 is regulated by valve 216 and fed to reactor 202 through conduit 218. Reflux distillation column 220 removes reaction byproducts and evaporated nonreactive carrier from reactor 202 and passes them through conduit 222 to condenser 224. Condensed nonreactive carrier 225 is collected in the bottom of condenser 224 and reaction byproducts are removed via port 226. Drain conduit 228, pump 230 and return conduit 232 enable condensed nonreactive carrier 225 to be returned to column 220. A carboxylic acid reactant stored in vessel 240 is melted using extruder 242 and fed to reactor 202 through conduit 244. As is the case for the FIG. 1 embodiment, extruder 242 may be omitted for carboxylic reactants that can be added in solid form directly to reactor 202 or melted in vessel 240. A glycol reactant stored in vessel 246 is regulated by valve 248 and fed to reactor 202 through conduit 250. An esterification catalyst solution stored in vessel 252 is regulated by valve 254 and fed to reactor 202 through conduit 256. At the completion of the esterification reaction, an oligomer or low molecular weight polyester product is obtained and is further reacted to form a polyester syrup. Nonreactive carrier stored in vessel 258 is regulated by valve 260 and fed to reactor 202 through conduit 262. A polycondensation catalyst solution stored in vessel 264 is regulated by valve 266 and fed to reactor 202 through conduit 268. The polycondensation reaction is carried out under pressure and its progress may be monitored by withdrawing samples at sampling port 270 when valve 272 is opened. The polycondensation reaction product syrup 274 is removed from reactor 202 by opening valve 276 and feeding the reaction product 274 through conduit 278 to shipping tote 280.

Figure 3:
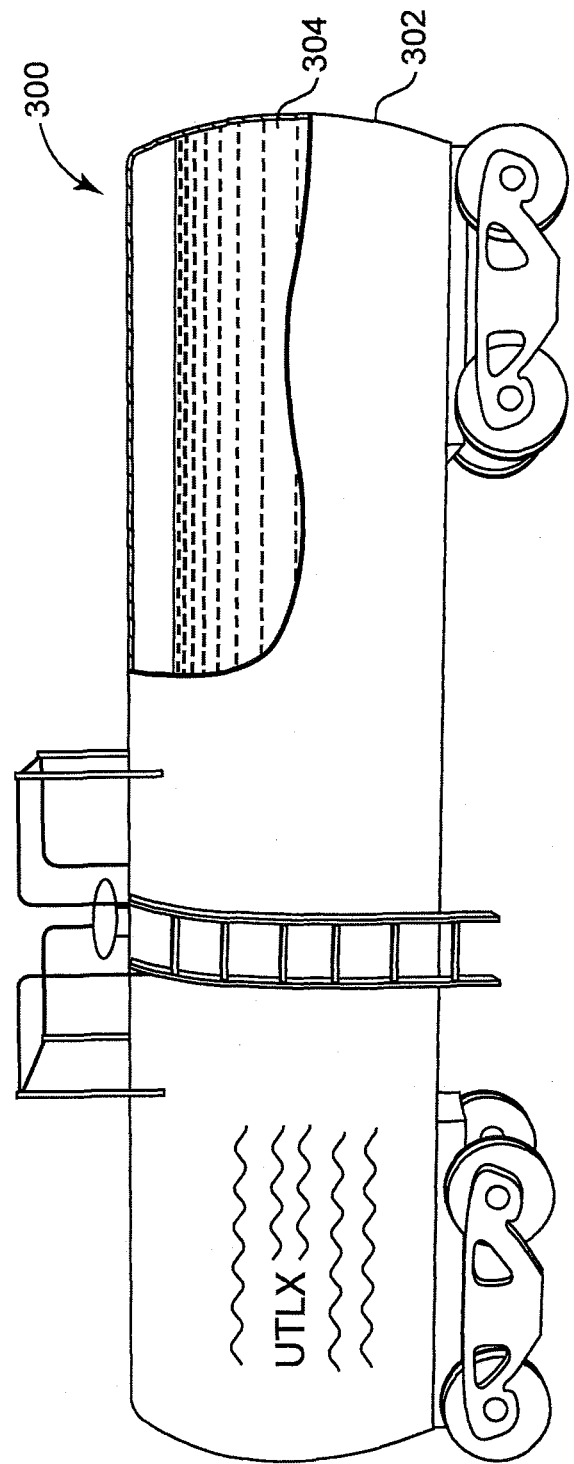
FIG. 3 is a perspective cutaway view of a shipping container filled with the disclosed polyester syrup.

FIG. 3 shows another exemplary shipping container 300 for transporting the disclosed polyester syrup. Rail tank car 302 contains polyester syrup 304 as a solution of the polyester in nonreactive carrier. Syrup 304 may conveniently be used as is to form polyester coatings and other initially non-solid products, or readily combined (using for example a stirrer or static mixer) with other suitable liquid or solid ingredients without first having to be melted or combined with a carrier.

A variety of dicarboxylic acids or their anhydrides or esters may be used in the disclosed process. Representative dicarboxylic acids for use in direct esterification reactions include but are not limited to saturated carboxylic acids, unsaturated carboxylic acids, their anhydrides, and combinations thereof, and the eventual polyester may be a saturated or unsaturated polyester. The dicarboxylic acids may be aromatic, aliphatic or cycloaliphatic. Exemplary dicarboxylic acids include but are not limited to maleic acid, chloromaleic acid, famaric acid, itaconic acid, citraconic acid, mesaconic acid, malic acid, succinic acid, glutaric acid, d-methylglutaric acid, adipic acid, sebacic acid, pimelic acid, o-phthalic acid, isophthalic acid (IPA), terephthalic acid (TPA), dihydrophthalic acid, tetrahydrophthalic acid, hexahydrophthalic acid, tetrachlorophthalic acid, chlorendic acid, dodecanedicarboxylic acid, cis-5-norbornene-2,3-dicarboxylic acid, 2,6-naphthalene dicarboxylic acid, dimethyl-2,6-naphthenic dicarboxylic acid, 1,4-cyclohexane dicarboxylic acid and their anhydrides. Preferred dicarboxylic acids include terephthalic acid, isophthalic acid, o-phthalic acid, glutaric acid, adipic acid, 1,4-cyclohexane dicarboxylic acid, 2,6-naphthalene dicarboxylic acid, hexahydrophthalic acid, adipic acid and their anhydrides and esters. Esters (e.g., methyl esters) of any of the above dicarboxylic acids may be employed in transesterification reactions. The reaction mixture may if desired contain minor amounts of monocarboxylic acids or esters or minor amounts of tri- or higher carboxylic acids or esters, including but not limited to for example, ethylhexanoic acid, propionic acid, trimellitic acid, benzoic acid, 4-methylbenzoic acid, 1,2,4-benzenetricarboxylic acid, 1,2,4,5-benzenetetracarboxylic acid, and their anhydrides or esters.

A variety of glycols may be used in the disclosed process. Representative glycols for use in direct esterification reactions include but are not limited to linear, cyclic, and branched aliphatic diols having 2 or more (e.g., 2 to about 8) carbon atoms; aliphatic and aromatic ether glycols having 4 or more (e.g., 4 to about 20, or 4 to about 10) carbon atoms; and combinations thereof. Exemplary glycols include but are not limited to ethylene glycol (also referred to as EG, B.P. 195° C. at atmospheric pressure), 1,2-propanediol (propylene glycol or PG, B.P. 188° C.), 1,3-propanediol (B.P. 214° C.), 2-methyl-1,3-propanediol (MPDiol, B.P. 212° C.), 2,2-dimethyl-1,3-propanediol (neopentyl glycol or NPG, B.P. 208° C.), 2,2,4-trimethyl-1,3-pentanediol (TMPD Glycol, initial B.P. 220° C.), 2-butyl-2-ethyl-1,3-propanediol (BEPG, B.P. 103-106° C.), 3-hydroxy-2,2-dimethylpropyl 3-hydroxy-2,2-dimethyl propanate, 1,3-butylene glycol (B.P. 204° C.), 1,4-butanediol (B.P. 230° C.), 3-methyl-1,5-pentanediol (MPD, B.P. 249° C.), 1,6-hexanediol (B.P. 250° C.), 1,2-cyclohexanediol (B.P. 118-120° C. at 10 mm Hg), 1,4-cyclohexanediol (B.P. 150° C. at 50 mm Hg), 1,4-bis (hydroxymethyl)cyclohexane (cyclohexanedimethanol or CHDM, B.P. 283° C.), 2,2-dimethyl heptanediol, 2,2-dimethyl octanediol, diethylene glycol (DEG, B.P. 245° C.), triethylene glycol (TEG, B.P. 285° C.), dipropylene glycol (B.P. 229-232° C.), tripropylene glycol (B.P. 273° C.), polyethylene glycol (PEG), hydroquinone bis(2-hydroxyethyl)ether, diethylene ether glycol (B.P. 197° C.), poly (ethylene ether) glycol, 2,2-bis-(p-hydroxycyclohexyl)-propane, 5-norbornene-2,2-dimethylol, and 2,3-norbornene diol. The reaction mixture may be prepared without or substantially without the use of EG or PG and instead prepared using higher boiling point glycol(s) which in conventional polyester polymer syntheses might normally not be employed alone. For example, the reaction mixture may be prepared using only glycols having atmospheric pressure boiling points of at least about 196° C., at least about 200° C., at least about 204° C. or at least about 208° C. This may enable the synthesis of novel polyester polymers having especially desirable physical properties (e.g., altered crystallinity, glass transition temperature, softening point or melt flow rate) not available or not readily available in polyester polymers derived from EG or PG. Preferred glycols include 2-methyl-1,3-propanediol, 2,2-dimethyl-1, 3-propanediol, 1,3-butylene glycol, 1,4-butanediol and 1,6-hexanediol. The reaction mixture may if desired contain minor amounts of monofunctional alcohols or minor amounts of tri- or higher-functional alcohols, including but not limited to 2-ethylhexyl alcohol, 2-cyclohexyl ethanol, 2,2-dimethyl-1-propanol, lauryl alcohol, benzyl alcohol, cyclohexanol, glycerol, trimethylol propane, trimethylol ethane, di-trimethylol propane, pentaerythritol, dipentaerythritol and tripentaerythritol.

A variety of catalysts may be employed for esterification and will be familiar to persons having ordinary skill in the art. Exemplary catalysts include but are not limited to inorganic and organic compounds of titanium, tin, lanthanum, zinc, copper, magnesium, calcium, manganese, iron and cobalt, including oxides, carbonates and phosphorus compounds, alkyl compounds, aryl compounds and aryl derivatives, as well as combinations of two or more thereof. Representative catalysts include but are not limited to titanium catalysts (e.g., tetraisopropyl titanate and tetraisobutyl titanate); mixed titanium/zirconium catalysts; lanthanum acetylacetonate; cobalt acetate; organic titanium and organic zirconium compounds such as those disclosed in U.S. Pat. Nos. 3,056,818, 3,326,965, 5,981,690 and 6,043,335; and tin catalysts including n-butylstannoic acid, octylstannoic acid and others as described in U.S. Pat. Nos. 6,281,325 and 6,887,953. The catalyst may be employed in an amount sufficient to promote the desired direct esterification or transesterification reaction, for example about 5 to about 10,000 ppm catalyst based on the polyester weight.

The hydroxyl:acid mole ratio for a direct esterification reaction (or the hydroxyl:ester ratio for a transesterification reaction) may for example be from about 0.5:1 up to about 2:1, and preferably between about 0.5:1 and about 1.5:1, between about 0.8:1 and about 1.2:1, between about 0.9:1 and about 1.1:1, between about 0.95:1 and about 1.05:1 or between about 0.98:1 and about 1.02:1. Preferably an excess of hydroxyl is employed, and preferably the hydroxyl:acid or hydroxyl:ester mole ratio is between about 1:1 and about 2:1, between about 1:1 and about 1.5:1, between about 1:1 and about 1.2:1, between about 1:1 and about 1.1:1, between about 1:1 and about 1.05:1 or between about 1:1 and about 1.02:1. The desired ratio may be well below the ratios normally used for direct esterification where a substantial excess of glycol typically is employed. The disclosed process thus permits a reduction in the amount of glycol employed at the start of the esterification reaction, and permits the reaction to be performed using glycols with boiling points above the 196° C. boiling point of ethylene glycol. This may speed the reaction rate, alter the number of side reactions or make it easier to attain a targeted number average molecular weight for the ester oligomer or for the final polyester. For example, approximately a 1.025:1 hydroxyl:acid ratio may provide an approximately 10,000 amu final polyester product, and approximately a 1.01:1 hydroxyl:acid ratio may provide an approximately 20,000 amu final polyester product. The end product number average molecular weight will increase sharply as the hydroxyl:acid or hydroxyl:ester mole ratio approaches 1:1, and thus careful monitoring of the ratio during the course of the esterification reaction will help avoid overshooting a targeted number average molecular weight.

Esterification may be performed using a batch or continuous reaction process. Heating may be employed prior to feeding, during feeding, during mixing, or combinations thereof. The temperature may be held at a constant value or may be varied during the course of esterification. The reactants desirably are maintained at a temperature sufficient to promote rapid reaction and evolution of water, methanol or other byproducts while avoiding decomposition of the oligomer. For polyesters derived from ethylene glycol, reaction temperatures of about 210-235° C. are recommended. The esterification reaction conveniently may be performed at atmospheric or elevated pressure, for example at gauge pressures from about 34 KPa (5 psi) up to about 100 KPa (15 psi), up to about 200 KPa (29 psi) or up to about 300 KPa (44 psi). The use of elevated pressure may provide an increased reaction rate, and the use of elevated pressure together with temperatures lower than those employed in the absence of pressure may limit the number of side reactions. The esterification reaction preferably forms a hydroxyl-functional and optionally acid-functional oligomer having a greater hydroxyl number than acid number. Unlike typical practice for making solid polyester products, the disclosed esterification reaction may be performed using a carrier whose presence in the final product would not be objectionable. Adding a carrier during oligomerization would also make it difficult to use typically-employed intrinsic viscosity measurement techniques to monitor the reaction progress. However, by employing a non-viscometric measurement technique (discussed in more detail below) to monitor one or both of the oligomerization and polycondensation reactions, monitoring may be carried out despite the presence of carriers which alter the reaction mixture viscosity.

A variety of carriers may be used, including the nonreactive carriers discussed in more detail below. Fractional distillation may be used to remove water, methanol and other byproducts from the esterification reactor and to return glycol (and if employed, nonreactive carrier) to the reactor. In a production setting, the esterification reaction may for example be carried out in less than about 8, less than about 7 or less than about 6 hours including time required to heat the reactants but not including time to cool the product. The resulting oligomeric product may immediately be converted to higher molecular weight polyester while still hot, or may be cooled or stored in any convenient fashion as desired and later converted.

The polycondensation reaction may be carried out in a different reactor from the reactor used for esterification (e.g., as in FIG. 1), or in the same reactor used to perform esterification (e.g., as in FIG. 2). The oligomer is combined with a suitable catalyst and nonreactive carrier at elevated pressure and elevated temperature. Water and glycol are removed via azeotropic reflux with the nonreactive carrier. The end product preferably is a syrup rather than a solid. By avoiding production of a solid end product, a wider array of diol reactants may be employed, including higher-boiling diols whose unreacted residuum might otherwise be difficult to remove using vacuum and heat. For example, the disclosed process enables use of diols whose boiling points approach or exceed temperatures at which the polyester product might decompose. The end product typically contains appreciable quantities (e.g., 5 wt. % or more) of nonreactive carrier. Adding a carrier would be undesirable in the conventional approach for manufacturing medium or high molecular weight polyester resins, since the added carrier would have to be removed to obtain the normally-desired solid end product. Adding a viscosity-reducing carrier during polycondensation would also make it difficult to use intrinsic viscosity measurement techniques to monitor the polymer-forming reaction. However, by employing a non-viscometric measurement technique, monitoring may be carried out despite the presence of carriers which alter the reaction mixture viscosity. The targeted number average molecular weight for a medium molecular weight polyester may for example be 4,000 to 7,000 amu, 5,000 to 7,000 amu, 5,000 to 6,000 amu or 6,000 to 7,000 amu. The targeted number average molecular weight for a high molecular weight polyester may for example be more than 7,000 amu (e.g., at least 7,001 emu), 7,001 to 30,000 amu, 7,001 to 25,000 amu, 7,001 to 20,000 amu, 8,000 to 30,000 amu, 8,000 to 25,000 amu, 8,000 to 20,000 amu, 10,000 to 25,000 amu, 10,000 to 20,000 amu, 10,000 to 18,000 amu or 10,000 to 16,000 amu.

As noted above it may be desirable to employ hydroxyl:acid or hydroxyl:ester mole ratios approaching 1:1. Under such circumstances the polymer number average molecular weight can increase rapidly. When forming high molecular weight polyesters or when using viscometric measuring techniques to monitor the reaction progress, and may be all too easy to overshoot the desired reaction endpoint. Alternative monitoring methods such as the use of gel permeation chromatography to determine number average molecular weight, or titrations to determine hydroxyl number may likewise be too time consuming when the polymer-forming reaction is underway. Progression or completion of one or both of the disclosed ester oligomerization and polycondensation reactions preferably employs a non-viscometric monitoring technique. A variety of such techniques may be employed, with the main criteria being rapid availability of measurement results and accuracy as good as or preferably better than the accuracy obtainable using intrinsic viscosity measurements. The use of near-IR analysis to monitor the disappearance of hydroxyl and acid groups is an especially preferred technique. Nuclear magnetic resonance as described in U.S. Pat. No. 6,887,953 B2 may also be employed. The measurement results may be used to determine whether additional starting material (e.g. additional diacid or glycol) should be added to the reactor during the ester oligomerization or polycondensation reactions in order to correct the reaction mixture and assist in reaching a targeted number average molecular weight. Non-viscometric techniques may also be combined with viscometric techniques (such as the measurement of intrinsic viscosity or the monitoring of stirrer torque) to monitor the ester oligomerization and polycondensation reactions.

The polyester polymer may be formulated to obtain targeted properties other than molecular weight, or to obtain properties at a given number average molecular weight that are not available in commercially-supplied polyester polymers. One preferred subclass of polyester polymers contains linear polyester polymers having a number average molecular weight (Mn) of 6,000 to 20,000 amu and a hydroxyl number of 5 to 20, the polymer backbone being free of or substantially free of ethylene oxide or propylene oxide groups. Linear polyester polymers within such subclass and having a number average molecular weight greater than 6000 amu, or less than 15,000 amu, or less than 12,000 amu, are also preferred. Another preferred subclass of polyester polymers has a Tg greater than 20 and less than 40° C. and a number average molecular weight of 7,001 to 20,000 amu. Polyester polymers within such subclass having a Tg greater than 25 and less than 35° C. are also preferred. For example, the Tg may be chosen so as to provide a polyester polymer that is non-tacky at room temperature but which is sufficiently flexible so that a coating made using the polymer resists cracking or crazing when bent. Yet another preferred subclass of polyester polymers is derived from at least some aromatic dicarboxylic acid, anhydride or ester.

A variety of catalysts may be employed in the polycondensation reaction and will be familiar to persons having ordinary skill in the art. Exemplary catalysts include but are not limited to those mentioned above in connection with the esterification reaction, used in amounts sufficient to promote the polycondensation reaction, for example about 5 to about 10,000 ppm catalyst based on the polyester weight.

A variety of nonreactive carriers may be employed. Representative nonreactive carriers include but are not limited to hydrocarbons, fluorocarbons, ketones and mixtures thereof. The chosen nonreactive carrier may be selected based on a variety of parameters including its azeotropic boiling point characteristics when mixed with water, any contemplated later processing steps or storage considerations, volatile organic compound (VOC) considerations, or the intended end uses for products which may be made from the disclosed polyester syrup. The nonreactive carrier may for example have a boiling point greater than the highest expected temperature at which the polyester syrup may be stored (e.g., at least about 60° C.) up to temperatures as high as or even exceeding temperatures at which the polyester product might decompose (e.g., up to or in excess of 250° C., 260° C., 275° C. or 300° C.). For example, the nonreactive carrier may have a boiling point of about 60 to about 300° C., about 140 to about 300° C., about 150 to about 300° C. or about 175 to about 300° C. Preferably the nonreactive carrier has a boiling point greater than or equal to that of xylenes (140° C.) and more preferably greater than or equal to that of kerosene (150° C.). Exemplary nonreactive carriers include alkanes such as heptane (B.P. 98° C.), octane (B.P. 126° C.), mineral spirits (B.P. 140-300° C.) and mixtures thereof; aromatic hydrocarbons including toluene (B.P. 110° C.), xylene (B.P. 140° C.), ligroin (B.P. 60-90° C.), commercially-available materials such as the "AROMATIC" series fluids (e.g., AROMATIC 150 and AROMATIC 200) from ExxonMobil Corp. and the SHELLSOL™ series fluids (e.g., SHELLSOL A100 and SHELLSOL A150) from Shell Chemical Co, and mixtures thereof; petroleum solvents including petroleum naphtha, VM&P naphtha, Stoddard solvent, kerosene (B.P. 150° C.) and mixtures thereof, plant-derived solvents including turpentine (B.P. 150-180° C.); ketones including methyl ethyl ketone (B.P. 80° C.), methyl isobutyl ketone (B.P. 117° C.), methyl isoamyl ketone (B.P. 144° C.), methyl amyl ketone (B.P. 150° C.), cyclohexanone (B.P. 156° C.), isobutyl ketone (B.P. 168° C.), methyl hexyl ketone (B.P. 173° C.), methyl heptyl ketone (B.P. 192° C.) and mixtures thereof, and mixtures of different such classes of nonreactive carriers. Aromatic hydrocarbons are preferred nonreactive carriers. Sufficient nonreactive carrier should be employed to provide a stirrable reaction mixture and to provide a final product in the form of a polyester syrup. The nonreactive carrier may be used in a relatively high proportion (e.g., in amounts corresponding to about 5% or more, about 10% or more, about 15% or more, about 20% or more, about 30% or more, about 40% or more or about 50% or more of the final polyester syrup weight). The nonreactive carrier may for example be as much as about 95%, about 90%, about 85%, about 80%, about 70%, about 60% or about 50% of the final polyester syrup weight. Large amounts of nonreactive carrier generally help increase the polycondensation reaction rate, shorten the polycondensation reaction cycle time or reduce the required stirring torque.

The polycondensation reaction may be performed at any convenient elevated temperature so long as the polymer forms at a suitable rate and does not undesirably degrade. The reaction temperature may for example be about 200 to about 260° C., about 215 to about 250° C. or about 225 to about 235° C. (as determined by measuring the temperature of the reactants themselves rather than the headspace above the reactants). The reaction may be performed at pressures above atmospheric pressure, for example at gauge pressures from about 34 KPa (5 psi) up to about 100 KPa (15 psi), up to about 200 KPa (29 psi), up to about 300 KPa (44 psi), up to about 400 KPa (58 psi) or up to about 500 KPa (73 psi). The polycondensation reaction proceeds more rapidly at higher temperatures. Temperatures of about 210 to about 250° C. and more preferably about 210 to about 235° C., and pressures of about 200 to about 350 KPa are preferred for polyesters derived from ethylene glycol. In a production setting, the polycondensation reaction may for example be carried out in less than about 8, less than about 7 or less than about 6 hours not counting time to heat the reactants or cool the product. These times are considerably shorter than the times that have been required for conventional solid state polyester polycondensation.

Since the final product preferably will be a polyester syrup rather than a solid (e.g., pelletized) polyester, there are few penalties and in fact several advantages associated with the disclosed process. For example, as noted above the disclosed polyester syrup may be much more conveniently used to manufacture polyester coatings than is the case when starting from a pelletized solid. By conducting the polycondensation reaction under pressure rather than under vacuum, the polycondensation reaction rate may increase or the cycle time may shorten. The polycondensation reaction mixture may be stirred, thus further shortening cycle times. The polycondensation reaction may be performed at reduced temperatures compared to a conventional polycondensation reaction, thus limiting the occurrence of side reactions. The use of pressure rather than vacuum during the polycondensation reaction may also reduce overall capital or operating costs, as vacuum reactors can be more expensive to build or more difficult to operate than pressurized reactors. It should be noted however that preparation of high molecular weight polyesters using the disclosed process may (in comparison to medium molecular weight polyester preparation) require use of an enlarged polycondensation reaction kettle stirring motor, a longer or higher temperature reaction cycle time, an increased flow of nitrogen or other purging gas through the reactor, quicker measurement of polycondensation reaction progress, or a combination of these measures.

The resulting polyester syrup may for example contain about 5 to about 95 wt. % polyester solids and about 95 to about 5 wt. % nonreactive carrier, with the desired amounts of polyester and nonreactive carrier normally depending somewhat on the polyester number average molecular weight. A medium molecular weight polyester syrup might for example contain about 40 to about 95 wt. % polyester solids and about 60 to about 5 wt. % nonreactive carrier, or about 50 to about 80 wt. % polyester solids and about 50 to about 20 wt. % nonreactive carrier. A high molecular weight polyester syrup might for example contain about 5 to about 80 wt. % polyester solids and about 95 to about 20 wt. % nonreactive carrier, about 10 to about 70 wt. % polyester solids and about 90 to about 30 wt. % nonreactive carrier or about 20 to about 60 wt. % polyester solids and about 80 to about 40 wt. % nonreactive carrier. If desired, additional carriers (including nonreactive carriers) may be added to the polyester syrup after completion of the polycondensation reaction. For example, reactive carriers (e.g., esters) may be added once the syrup has cooled sufficiently so as to discourage reactions with the polyester. However, in one preferred embodiment the syrup is substantially free of alcohols, glycols or esters that could react with the polyester at polycondensation temperatures (e.g., at the actual temperature or temperatures at which the polycondensation reaction occurred).

The syrup may be used as is to form products or stored or shipped for use at another time or in another place. A variety of shipping containers may be used, including drums such as the drum 106 shown in FIG. 1, totes such as the tote 280 shown in FIG. 2, rail tank cars such as the tank car 300 shown in FIG. 3, truck tank trailers, trucks, bottles, cans, sachets and other shipping containers that will be or will become familiar to persons having ordinary skill in the art. The chosen shipping container desirably will meet applicable requirements for interstate shipment and applicable fire codes for storage.

Products which may be formed from the polyester syrup include but are not limited to initially non-solid products such as paints and primers (e.g., corrosion-resistant primers containing high molecular weight polyesters), coil coatings, sheet coatings, packaging coatings, sealants and adhesives. Additives including coating formation carriers, coalescing agents, pigments, dyes, fillers, thickeners, dispersing aids, flow modifiers, viscosity modifiers, antifoam agents, UV absorbers, inhibitors, binders, crosslinking agents and initiators (including photoinitiators) may be combined with the polyester syrup. The amounts and types of such additives will be or will become familiar to persons having ordinary skill in the art.

The invention is further described in the following Examples, in which all parts and percentages are by weight unless otherwise indicated.

EXAMPLE 1

Preparation of a High Molecular Weight Polyester Resin

A mixing vessel equipped with an agitator, distillation column, condenser, thermometer, and inert gas inlet was charged with 3.2 moles 2-methyl 1,3-propanediol, 3.06 moles 1,3-benzene dicarboxylic acid and 0.8 grams FAST-CAT™ 4201 dibutyltin oxide catalyst (from Arkema Inc.). The reactants had a 1.046:1 hydroxyl:acid ratio and did not include EG or PG. The reactor was flushed with inert gas and heated to 235° C. over 4 hours while removing water. The batch temperature was held at 235° C. until an acid number of 18-25 was achieved, as determined by adding AROMATIC 150 fluid (from ExxonMobil Corp.) to dilute and cool the sample, followed by titration with 0.1 N methanolic KOH solution to a pH 12 endpoint. The batch hydroxyl number was also determined in under 30 minutes, by adding AROMATIC 150 fluid to dilute and cool a further sample, reacting the OH groups with excess anhydride to convert them to acid groups, followed by titration with 0.1 N methanolic KOH to a pH 12 endpoint. The reaction temperature was lowered to 180° C. and additional 1,3-benzene dicarboxylic acid was added to adjust the hydroxyl:acid ratio to 1.03:1. Polycondensation was started using azeotropic distillation and sufficient AROMATIC 150 fluid (as nonreactive carrier) to provide 17% aromatic hydrocarbon and 83% nonvolatile reactor contents in the distillation mixture. The reaction temperature was increased to 235° C. and the reaction vessel pressure was allowed to rise to 100 KPa (15 psi). The batch temperature was maintained at 215° C. until an acid number less than 3.0 was achieved. The final acid number was 2.9 and the final hydroxyl number was 8.0. The color as measured on the Gardner scale was 1 and the resin was free from haze. The product number average molecular weight was Mn=9,087 as determined by Gel Permeation Chromatography.

EXAMPLE 2

Preparation of a Medium Molecular Weight Polyester Resin

A mixing vessel equipped with an agitator, distillation column, condenser, thermometer, and inert gas inlet is charged with 3.2 moles 2-methyl 1,3-propanediol, 3.06 moles 1,3-benzene dicarboxylic acid and 0.8 grams FAST-CAT 4201 dibutyltin oxide catalyst. The reactants have a 1.046:1 hydroxyl:acid ratio and do not include EG or PG. The reactor is flushed with inert gas and heated to 235° C. over 4 hours while removing water. The batch temperature is held at 235° C. until an acid number of 18-25 is achieved. The reaction temperature is lowered to 180° C. and additional 1,3-benzene dicarboxylic acid are added to adjust the hydroxyl:acid ratio to 1.04:1.0. Polycondensation is started using azeotropic distillation and sufficient AROMATIC 150 fluid to provide 17% aromatic hydrocarbon and 83% nonvolatile reactor contents in the distillation mixture. The reaction temperature is increased to 235° C. and the reaction vessel pressure is allowed to rise to 100 KPa (15 psi). The batch temperature is maintained at 215° C. until an acid number less than 3.0 and a targeted molecular number average molecular weight of 5,500 amu are achieved.

Having thus described the preferred embodiments of the present invention, those of skill in the art will readily appreciate that the teachings found herein may be applied to yet other embodiments within the scope of the claims hereto attached. The complete disclosure of all patents, patent documents, and publications are incorporated herein by reference as if individually incorporated.

We claim:
1. A process for preparing high molecular weight polyester syrups, which process comprises:
 a) providing or forming an ester oligomer in a first esterification step and substantially without ethylene glycol or propylene glycol, wherein the hydroxyl:acid or hydroxyl:ester ratio is from about 0.98:1 to about 1.1:1;
 b) converting the oligomer to a polyester polymer by stirring at pressure of about 34 kPa to about 100 kPa gauge and elevated temperature a reaction mixture containing the oligomer and 5 wt.% or more of a nonreactive carrier capable of forming an azeotrope with water and having a boiling point greater than that of xylenes;

c) allowing the pressure to rise to about 100 kPa; and
d) removing water from the reaction mixture via azeotropic reflux to provide a syrup comprising a medium high molecular weight polyester polymer in the nonreactive carrier.

2. The process according to claim 1 further comprising using a non-viscometric technique to monitor the conversion of oligomer to polymer.

3. The process according to claim 2 wherein near-IR analysis is used to monitor the disappearance of hydroxyl and acid groups.

4. The process according to claim 1 comprising forming the ester oligomer from at least one glycol having a boiling point greater than 196° C.

5. The process according to claim 1 comprising forming the ester oligomer from a glycol or glycols each having a boiling point greater than 200° C.

6. The process according to claim 1 comprising forming the ester oligomer from a glycol or glycols each having a boiling point greater than 200° C.

7. The process according to claim 1 comprising forming the ester oligomer from a glycol or glycols each having a boiling point greater than 204° C.

8. The process according to claim 1 wherein the syrup does not contain alcohols, glycols or esters that could react at polycondensation temperatures with the polymer.

9. The process according to claim 1 wherein the polymer has number average molecular weight of 4,000 to 7,000 amu.

10. The process according to claim 1 wherein the polymer has number average molecular weight of 7,001 to 30,000 amu.

11. The process according to claim 1 wherein the polymer has number average molecular weight of 8,000 to 25,000 amu.

12. The process according to claim 1 further comprising forming the ester oligomer in the nonreactive carrier.

13. The process according to claim 1 wherein the nonreactive carrier comprises an alkane, aromatic hydrocarbon, petroleum solvent, plant-derived solvent, ketone or mixture thereof.

14. The process according to claim 1 wherein the nonreactive carrier has a boiling point of up to about 300° C.

15. The process according to claim 1 wherein the nonreactive carrier has a boiling point of about 150 to about 300° C.

16. The process according to claim 1 wherein the nonreactive carrier is about 10% or more of the final syrup weight.

17. The process according to claim 1 wherein the elevated temperature is about 200 to about 260° C.

18. The process according to claim 1 wherein the elevated temperature is about 215 to about 235° C.

* * * * *